(12) United States Patent
Desai et al.

(10) Patent No.: US 11,078,578 B2
(45) Date of Patent: Aug. 3, 2021

(54) SYSTEM AND METHOD FOR ELECTROCHEMICAL SEPARATION OF OXYGEN

(71) Applicant: Palo Alto Research Center Incorporated, Palo Alto, CA (US)

(72) Inventors: Divyaraj Desai, Sunnyvale, CA (US); Jessica Louis Baker Rivest, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 528 days.

(21) Appl. No.: 15/858,187

(22) Filed: Jan. 25, 2018

(65) Prior Publication Data

US 2019/0226096 A1 Jul. 25, 2019

(51) Int. Cl.
| | | |
|---|---|---|
| *C25B 1/02* | (2006.01) | |
| *C25B 13/02* | (2006.01) | |
| *B01D 53/32* | (2006.01) | |
| *C25B 13/08* | (2006.01) | |
| *H01M 8/1041* | (2016.01) | |
| *H01M 8/0289* | (2016.01) | |
| *C25B 9/19* | (2021.01) | |

(52) U.S. Cl.
CPC .............. *C25B 1/02* (2013.01); *B01D 53/326* (2013.01); *C25B 9/19* (2021.01); *C25B 13/02* (2013.01); *C25B 13/08* (2013.01); *H01M 8/0289* (2013.01); *H01M 8/1041* (2013.01); *B01D 2256/12* (2013.01); *H01M 2300/008* (2013.01); *H01M 2300/0045* (2013.01)

(58) Field of Classification Search
CPC ............ H01M 8/1041; H01M 8/0289; H01M 2300/0045; H01M 2300/008; B01D 53/326; B01D 2256/12; Y02E 60/50; C25B 1/02; C25B 13/02; C25B 9/08; C25B 13/08

See application file for complete search history.

(56) References Cited

U.S. PATENT DOCUMENTS

| | | |
|---|---|---|
| 4,475,994 A | 10/1984 | Gagne et al. |
| 4,761,164 A | 8/1988 | Pez et al. |
| 5,855,570 A | 1/1999 | Scherson et al. |
| 2007/0184322 A1* | 8/2007 | Huang ................ H01M 8/2425 429/483 |
| 2016/0064763 A1 | 3/2016 | Sahu |

OTHER PUBLICATIONS

Alsultanny et al., "Oxygen Specific Power Consumption Comparison for Air Separation Units", Engineering Journal, vol. 18, Issue 2, Feb. 3, 2013, 14 pages.

(Continued)

*Primary Examiner* — Arun S Phasge
(74) *Attorney, Agent, or Firm* — Mueting Raasch Group

(57) ABSTRACT

A system comprises a first electrode, an electrolyte membrane, and a second electrode. The first electrode is configured to reduce oxygen in a gas to an oxygen carrier ion at an intermediate temperature. The electrolyte membrane is configured to transport the oxygen carrier ion, and the second electrode is configured to oxidize the oxygen carrier ion to an oxygen molecule. Oxidation of the oxygen molecule consumes less than four electrons.

19 Claims, 9 Drawing Sheets

(56) References Cited

OTHER PUBLICATIONS

Cui et al., "Experimental Vapor Pressure Data and a Vapor Pressure Equation for N, N-Dimethylformamide", J. Chem. Eng. Data, 51 (5), 2006, pp. 1860-1861.
Goff et al., "Complexation of Caesium and Rubidium Cations with Crown Ethers in N,N-Dimethylformamide", Polyhedron, vol. 15, Issue 21, Aug. 5, 1996, pp. 3897-3903.
Hayyan et al., "Superoxide Ion: Generation and Chemical Implications", Chemical Reviews, vol. 116, 2016, pp. 3029-3085.
Kitada et al., "An Ionic Liquid State Composed of Superoxide Radical Anions and Crownether-Coordinated Potassium Cations", Journal of the Electrochemical Society, vol. 164, Issue 7, 2017, pp. H5119-H5123.
Meixner et al., "Electrochemical Oxygen Separation Using Solid Electrolyte Ion Transport Membranes", Journal of the Electrochemical Society, vol. 165, Issue 4, 2002, pp. D132-D136.
Sapali et al., "Exergy Analysis of Cryogenic Air Separation Unit Integrated with Biomass Gasifier", Proceedings of the World Congress on Engineering and Computer Science, vol. 11, Oct. 23-25, 2013, 5 pages.
Shah et al., "Integration options for novel chemical looping air separation (ICLAS) process for oxygen production in oxy-fuel coal fired power plants", Fuel, vol. 107, 2013. pp. 356-370.
Shah et al., "Selection of Suitable Oxygen Carriers for Chemical Looping Air Separation: A Thermodynamic Approach", Energy Fuels, vol. 26(4), 2012, pp. 2038-2045.
EP Search Report dated Oct. 8, 2019 from EP App. No. 19152922.1, 9 pages.

\* cited by examiner

US 11,078,578 B2

1

SYSTEM AND METHOD FOR ELECTROCHEMICAL SEPARATION OF OXYGEN

TECHNICAL FIELD

This disclosure relates generally to separation of oxygen from a mixture, and more particularly, to electrochemical separation of oxygen.

BACKGROUND

The separation of oxygen from a gaseous mixture, such as air, is an important industrial process. For example, oxygen is used as a reactant gas in smelting of iron ore and steelmaking, manufacturing industrial chemicals, medical applications, metal cutting, and fuel gasification. While various processes may be used to separate and/or purify oxygen, these processes are energy intensive.

SUMMARY

Embodiments of the disclosure are directed to a system comprising a first electrode, an electrolyte membrane, and a second electrode. The first electrode (e.g., cathode) is configured to reduce oxygen in a gas to an oxygen carrier ion at an intermediate temperature. The electrolyte membrane is configured to transport the oxygen carrier ion to the second electrode by consuming less than four electrons. The second electrode (e.g., anode) is configured to oxidize the oxygen carrier ion to oxygen. In certain embodiments, the system is arranged with one or more similar systems where the systems in the plurality of systems are connected in parallel, series, or both.

Additional embodiments are directed to a method. The method includes receiving an input gas comprising oxygen. The gas is contacted with a first electrode of an electrochemical cell to reduce the oxygen to an oxygen carrier ion. The oxygen carrier ion is transported across the cell through an electrolyte membrane at an intermediate temperature. The oxygen carrier ion is then oxidized at a second electrode of the electrochemical cell, and an output oxygen gas is discharged. In various embodiments, the method is used to separate, purify, and/or compress oxygen.

Further embodiments are directed to an apparatus. The apparatus comprises a nanoporous support and at least one of a poly(electrolyte) and an ionic liquid. The apparatus is configured to transport oxygen species.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

Figure 1:
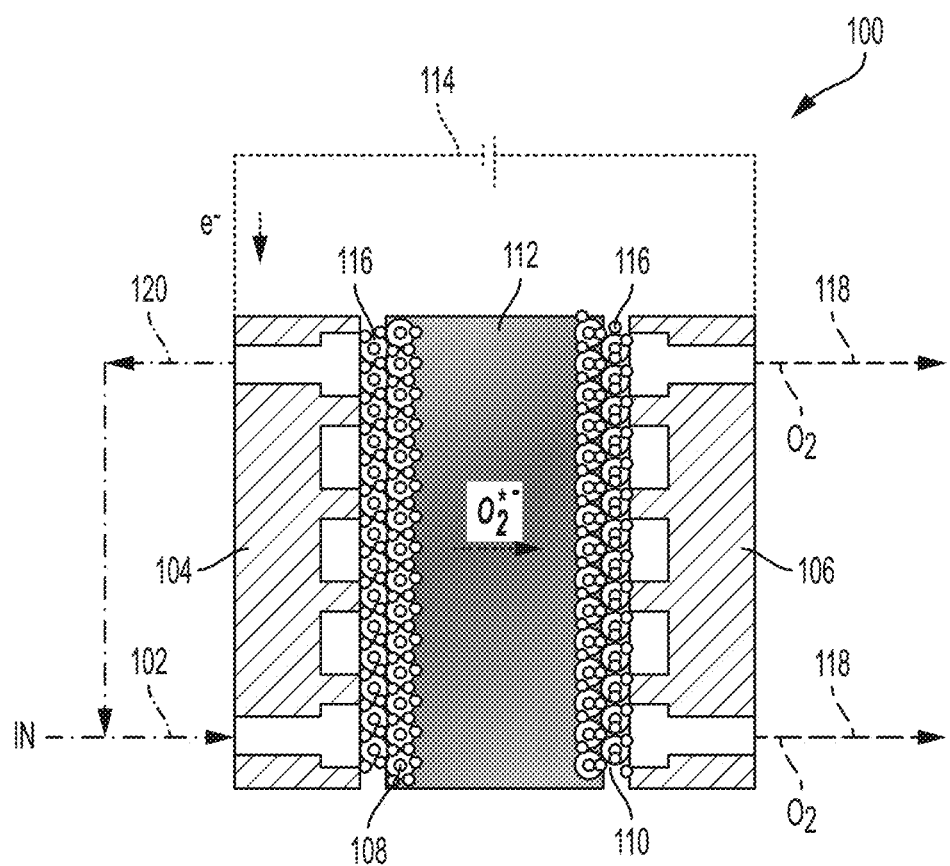
FIG. 1 is a schematic diagram of an electrochemical cell in accordance with certain embodiments.

The present disclosure is generally related to electrochemical oxygen separation. Physical processes for separating oxygen can be expensive to scale to industrial applications, can be limited in the purity of produced oxygen, and can be energy intensive. Similarly, chemically looped air separation (CLAS) processes utilize a significant temperature swing which increases the specific energy consumption and reactor capital cost. The chemically stable CLAS processes have a high operating temperature (e.g., 300-1600° C.), and the low temperature CLAS processes are either unstable or toxic. However, electrochemical separation processes can provide an output oxygen purity of greater than 99.99%.

Electrochemical oxygen separation approaches can be classified based on the type of oxygen carrier ion, which is most commonly an oxide ($O^{2-}$), a hydroxide ($[OH]^-$), a nitrite ($[NO_3]^-$), a peroxide ($[H_2O_2]^-$), or a superoxide ($O_2^-$) ion. For electrochemical separation, oxygen present in an input gas (e.g., a gaseous mixture) is catalytically reduced at a first electrode (e.g., cathode) to a specific ion, transported across an electrolyte, and re-oxidized at a second electrode (e.g., anode) to yield a purified oxygen output gas. The energy consumption of an electrochemical separation process is determined by the activation overpotential for oxygen reduction and ion electro-oxidation, as well as the number of electrons involved in the transport process. Since hydroxide and oxide transporting electrolytes consume four electrons per oxygen molecule transported, the specific energy consumption for processes utilizing these ions is high (e.g., 1680 kWh ton$^{-1}$ $O_2$). Also, oxide and nitrite transporting systems require high operating temperatures (e.g., 600-1000° C. for oxide ions and greater than 400° C. for nitrite ions), and hydroxide transporting electrolytes are susceptible to carbon dioxide poisoning.

Peroxide and superoxide transporting electrolytes present a more efficient path for oxygen separation by consuming two electrons or only one electron, respectively, for every oxygen molecule. However, superoxide generation using a superoxide salt dissolved in an aprotic solvent cannot be used as an electrolyte as the aprotic solvents are not ionic conductors. While certain solvents may serve as a superoxide generating electrolyte, their low boiling points and/or high vapor pressures limit their use to systems operating at a temperature of less than 100° C. At these low temperatures, both ionic conductivity and redox kinetics are reduced, which limits the oxygen flux for the system (e.g., less than 2 mol m$^{-2}$ h$^{-1}$). Moreover, using liquid electrolytes for superoxide transport involves limited hydrostatic pressure, and such a system cannot be used for oxygen compression.

The present disclosure is directed to embodiments involving electrochemical oxygen separation that consumes less than four electrons per oxygen molecule transported across an electrolyte membrane. The separation process occurs at an intermediate temperature, which is defined herein as a temperature equal to or above 100° C. and equal to or less than 300° C., which provides increased redox kinetics resulting in an oxygen flux of at least 10 mol m$^{-2}$ h$^{-1}$. Also, at these temperatures, low-cost materials, such as plastics, can be used to construct the systems. Electrochemical cells incorporating electrolyte membranes as described herein can be used for oxygen separation, purification, and compression. In certain embodiments, a plurality of electrochemical cells can be connected in series, parallel, or both to accomplish one or more of oxygen separation, purification, and compression within the same system.

Turning to FIG. 1, an electrochemical cell system 100 is shown in accordance with various embodiments described herein. The cell 100 includes a gaseous input 102 and one or more outputs 118 (two are shown). The input 102 can also involve two or more streams. In certain embodiments, the input 102 and/or output 118 may include a chamber for collection of input and/or output gas. The cell 100 includes a first electrode 108 (e.g., cathode), an electrolyte membrane 112, and a second electrode 110 (e.g., anode). Each of the electrodes 108, 110 also includes a current collector 104, 106 respectively, such as a bipolar plate with optional flow fields. An energy source 114 supplies power to the cell 100. While the energy source can provide electricity at a range of voltages, the voltage can be based on the type of oxygen carrier ion. For example, the voltage is about 0.5 volts, or less, for a superoxide ion and about 0.5 volts or greater (e.g., 0.5-2.0 V) for a peroxide ion. The input gas can be recycled through the system as shown by arrow 120 and/or is vented from the cell (not shown). As shown by the arrow 122, oxygen carrier ions travel from the first electrode, across the membrane 112, to the second electrode 110. The cell 100 may be secured in an enclosure alone, or with a plurality of other similar cells, and may include a heat source for heating the cell 100 to a temperature of at or above about 100° C. and less than about 300° C. In certain embodiments, the heat source and/or the energy source is integrated with a stack of electrochemical cells to improve portability and/or energy efficiency. Though not shown, the electrochemical cell is enclosed, either alone or in a stack of a plurality of cells, to maintain effective sealing and reduce thermal losses. End plates and/or the enclosure are comprised, for example, of one or more inert high temperature plastics such as perfluoroelastomers (e.g., perfluoroalkoxyalkanes (PFA), polytetrafluoroethylene (PTFE), Kalrez, PVDF, and polyimides).

In certain embodiments, one or more of the electrodes are coated with a catalyst 116. For example, a catalyst providing a high-surface area (e.g., greater than 10 m$^2$/g) can enhance the reaction kinetics of the electrochemical cell 100. Example catalyst materials include glassy carbon, Pt, Au, Pd, Ru, Ag, Ni, Co, Cu, $Fe_xO_y$, $Co_xO_y$, $Mn_xO_y$, and $Cu_xO$. A metal oxide catalyst could have x=1 or 2. In certain embodiments, a noble metal catalyst (e.g., Pt, Au, Pd, Ru, Ag) may be combined with a high surface area catalyst (e.g., carbon black) to reduce catalyst loading. The catalyst loading of a noble metal may vary from 0 to 4 mg cm$^{-2}$ (Pt basis), and the upper bound on the catalyst loading is reported using Pt metal as a basis.

The electrolyte membrane 112 transports the oxygen carrier ion across the cell 100 to the second electrode (e.g., anode) for (re)oxidation. Therefore, the electrolyte membrane 112 is configured to transport a superoxide, peroxide, and/or nitrite ion for a process consuming less than four electrons per oxygen molecule transported. The membrane 112 has an area-specific resistance less than about five Ω cm$^2$, and has a high mobility and transference number for the oxygen carrier ions while having low gas permeability. The membrane 112 comprises a support structure saturated with at least one of a poly(electrolyte) and an ionic liquid. Examples of poly(electrolytes) can include poly(1-vinylimidazolium trifluoromethanesulfonate), poly(1-vinylimidazolium trifluoromethanesulfonylimide), poly(1-vinylpyridinium trifluoromethanesulfonate), poly(1-vinylpyridinium trifluoromethanesulfonylimide), poly(1-vinylpyrrolidinium trifluoromethanesulfonate), poly(1-vinylpyrrolidinium trifluoromethanesulfonylimide), poly(1-vinylpyridinium trifluoromethanesulfonate), poly(1-vinylammonium trifluoromethanesulfonate), poly(1-vinylammonium trifluoromethanesulfonylimide), poly(1-vinylimidazolium trifluoromethanesulfonylimide), sulfonated tetrafluoroethylene, poly(dibenzo crown ether superoxide) including crown ethers such as 12-crown-4-ether, 15-crown-5-ether and 18-crown-6-ether; this is not a comprehensive list. The selection criterion for a poly(electrolyte) is the immobilization of a cation along a rigid polymer backbone to form an immobile poly(cation), and a mobile anionic species that can stably transport an oxygen ion that results in the overall consumption of less than four electrons per oxygen molecule.

For an oxygen ion transporting membrane, nanoporous media is saturated with ionic liquid electrolyte. Nanoporous herein describes pores having diameters in a nanometer range (e.g., 10-999 nm). Examples of nanoporous support media include anodized aluminum oxide having pores with diameters ranging from 20-999 nm and polyimide aerogels having pores with diameters of approximately 100 nm. Both types of nanoporous supports have a high porosity (>40%) and low membrane thickness (<250 μm) for a low area-specific resistance.

In certain embodiments, the electrolyte membrane 112 is a superoxide-conducting polymeric membrane. This can be formed by ion-exchange between a selected ionic liquid and a known ionomer such as sulfonated tetrafluoroethylene (Nafion). Alternatively, a poly(electrolyte) is developed by polymerizing one of the ions in an ionic liquid within the chains of an immobile polymer.

One example of a polymeric membrane 112 involves a monomer containing a poly(cation) such as 1-vinylimmidazolium cross-linked using a radical initiator like azobisisobutyronitrile. Thermally stable cross-linking agents that are compatible with the ionic liquid monomer are screened and added to provide increased flexibility of the finished membrane. Then, an anion (i.e. [OTf]$^-$, [tfsi]$^-$) is exchanged into the cross-linked polymeric ionic liquid membrane. Thus, an anion exchange polymeric ionic liquid membrane, with ionic liquid cation moiety fixed in the polymer backbone, preferentially transports superoxide ions. Notably, only poly(cation) and polycomplex poly(ionic liquids) selectively move anions and are used for polymeric ionic liquid membrane. The structure of polymeric ionic liquids provide an increase in the cation-anion distance and shield the cations and anions one from another. These membranes 1) improve ionic solvation by eliminating ionic pairing, 2) increase relative anionic mobility of an anion within the polymeric network, and 3) improve selectivity of superoxide ion transport within the polymer. An example of a reaction scheme for a poly(vinylimidazolium) [tfsi] membrane is shown below.

strate a proportionate boost in system performance (e.g., up to 100 times). In other embodiments, a [18C6K]$^+$O$_2^-$ molten salt is synthesized, which can be prepared by mixing equimolar mixtures of KO$_2$ and 18-crown-6-ether. The resulting solid has a melting point of about 40-50° C. and can be used in its molten form to saturate membranes used in the oxygen separation system. The salt is known to have poor ionicity due to the limited ionic dissociation. The conductivity (~10 μS cm$^{-1}$ at 60° C.) is improved using superoxide salts of alternative cations (e.g., Li, Na, Rb, Cs) in different crown ethers to prepare the ionic salt.

As mentioned above, the cell 100 can be operated as a single electrochemical cell, or multiple electrochemical cells 100 can be operated together. For example, a plurality of cells 100 can be arranged in a planar stack. Moreover, multiple stacks can be arranged in a modular configuration to adapt to fluctuations in demand. The arrangement of the cells is determined by the intended application for the stack (e.g., separation, purification, and/or compression).

Figure 2A:
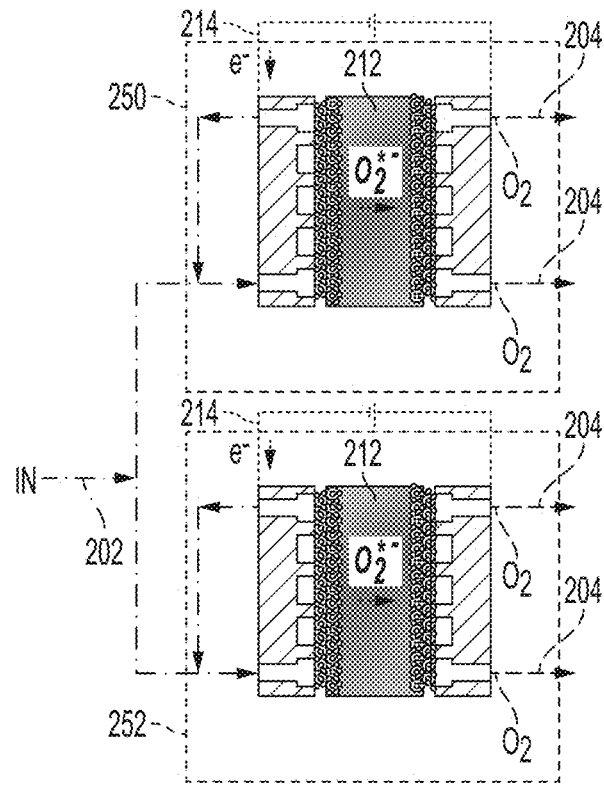
FIG. 2A is a schematic diagram of electrochemical cells arranged in parallel in accordance with certain embodiments.

FIG. 2A illustrates two electrochemical cells 250, 252 connected in parallel. As shown, a single input 202 feeds cells 250 and 252, and each cell 250, 252 has one or more (two each are shown) outputs 204. While each cell 250, 252 has an electrolyte membrane 212 and an energy source 214,

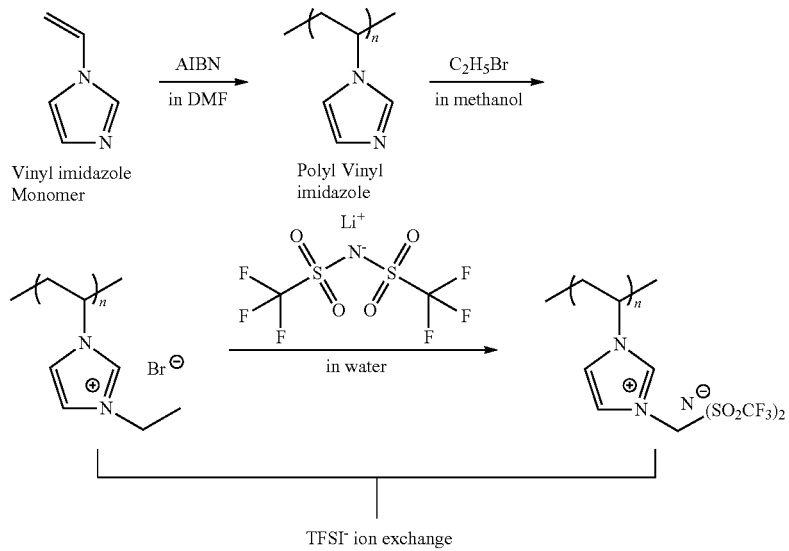

Polymeric membranes as described above are thermally stable, at least up to their melting point (e.g., 179° C.). Although room temperature ionic conductivity for these membranes is only about 0.3 MS cm$^{-1}$, this would be increased at an operating temperature in excess of the glass transition temperature (e.g., T$_g$~110° C.). Various ionic liquids that are suitable for use in preparing electrolyte membranes 112 are discussed further below in connection with FIGS. 4, 5A-B, and 6.

The optional addition of superoxide salts to the membrane 112 enhances the transference number and increases the oxygen flux across the membrane 112. The current density developed in the cell is directly proportional to the superoxide concentration. The superoxide concentration can be increased by the direct dissolution of superoxide ions in the ionic liquid. For example, at least 150 mM of KO$_2$ can be dissolved in ionic liquid at a temperature at or above 125° C. Membranes prepared using this electrolyte would demonthe cells are not necessarily identical (e.g., the membranes and/or catalysts may not be the same materials). Also, when multiple cells are arranged together, a single heat source or a plurality of heat sources may be used to keep the cells operating at an intermediate temperature of at or above 100° C. and at or less than 300° C. When cells are connected in parallel, the system can be used to separate and/or purify an output oxygen stream. When the system is used to separate oxygen from a mixture, the pressure of the input gas is approximately the same as that of the output oxygen gas, and when the system is used to purify oxygen, the pressure of the input gas is greater than the output oxygen gas. The system can produce an output gas with an oxygen partial pressure of at least 1 bar. In both processes, the parallel arrangement increases oxygen throughput.

Figure 2B:
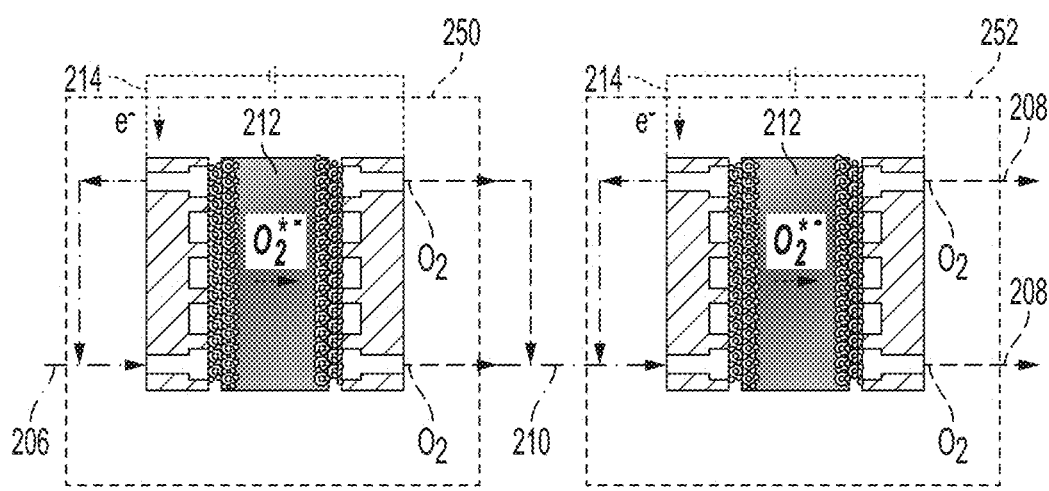
FIG. 2B is a schematic diagram of electrochemical cells arranged in series in accordance with certain embodiments.

In another embodiment, FIG. 2B illustrates two electrochemical cells 250, 252 connected in series. As shown, an input 206 feeds the first cell 250, and the output 210 of the first cell 250 feeds the second cell 252, which has one or more output streams 208 (two are shown). As discussed above, each cell 250, 252 can have any number of input and output streams. Similar to FIG. 2A, each cell 250, 252 has an electrolyte membrane 212 and an energy source 214, but the cells are not necessarily identical (e.g., the membranes and/or catalysts may not be the same materials). Also, when multiple cells are arranged together, a single heat source or a plurality of heat sources may be used to keep the cells operating at an intermediate temperature of at or above 100° C. and at or less than 300° C. When connected in series, the cells can compress the output oxygen stream by increasing the pressure differential across the first and terminal (last) electrodes of the full system (e.g., stack). Thus, when used for compression, the pressure of the input stream is less than the pressure of the output oxygen stream. In certain embodiments, the pressure differential may also be enabled with electrochemical pumping.

It should be noted that a single stack can include cells connected in series, parallel, or both. Any arbitrary arrangement of electrochemical cells as described herein can be devised to control the throughput of a desired oxygen product (e.g., to increase volume, purity and/or compression). For example, a system or stack may include any number of cells, such as from 1 to 1,000 cells. The area of each cell can vary from 1 to 10,000 $cm^2$, and depending on the number of cells, a stack can operate at a current density from 1 to greater than 1,000 A $m^{-2}$ (analogous to 0.04 to greater than 40 mol $m^{-2}$ $h^{-1}$). Since a single oxygen ion transporting membrane can tolerate a pressure differential of up to about 0.7 bar, a stack could operate as an oxygen compressor capable of creating a pressure differential of up to about 700 bar. Thus, a single stack oxygen compressor could deliver up to 1 ton per hour.

Figure 3:
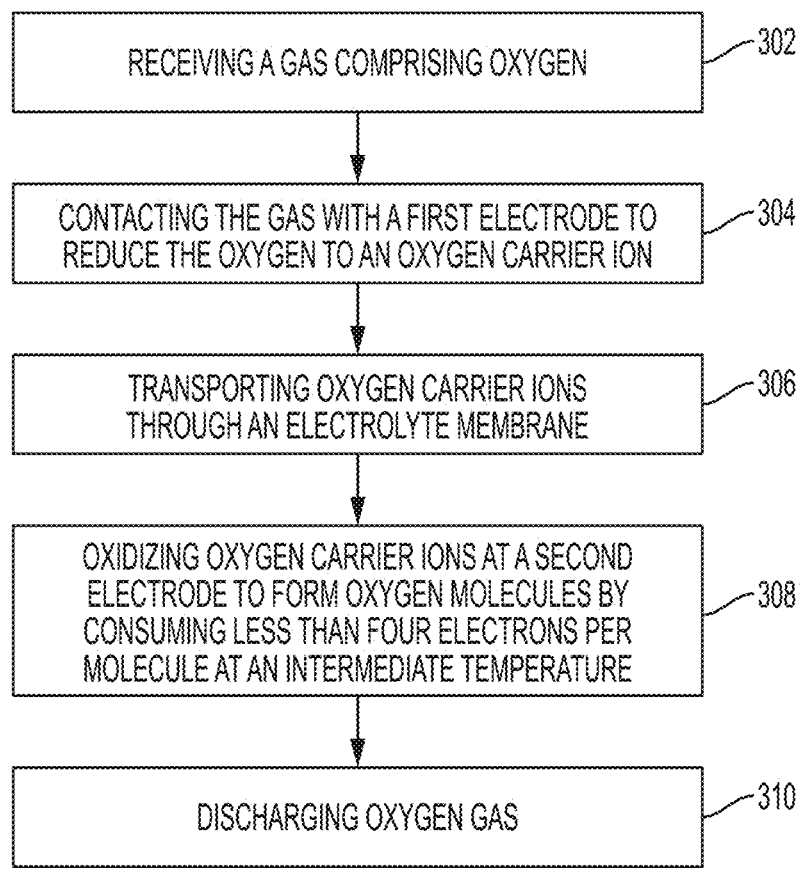
FIG. 3 is a flow diagram of a method in accordance with certain embodiments.

A process for using an electrochemical cell, or a combination of such cells, according to various embodiments is illustrated in FIG. 3. The method includes receiving a gas (e.g., a gaseous mixture) comprising oxygen 302. The gas can be any mixture of gases, including but not limited to, air and natural gas, or oxygen alone. The mixture is contacted with a first electrode (e.g., cathode) of an electrochemical cell to reduce the oxygen to an oxygen carrier ion 304. The oxygen carrier ion can include at least one of a superoxide ion, a peroxide ion, and a nitrite ion. For example, compounds such as nitrates ($[NO_2]^-$) and sulfites ($[SO_3]^-$) can serve as a superoxide or peroxide carrier through the following reactions: $[NO_3]^- + \frac{1}{2}O_2 + [NO_2]^- + O_2^-$ and $[SO_4]^{2-} + \frac{1}{2}O_2 + 2e^- \rightarrow [SO_3]^{2-} + O_2^-$. Both nitrate and sulfated based ionic liquids, as discussed further below, can be used to form an electrolyte membrane to extract, for example, $NO_2$ and/or $SO_2$ from rich gas streams. Similar to water, which has a low dissociation constant but can participate in electrochemical reactions, non-dissociated superoxide (e.g., crown ester complexed or non-complexed $KO_2$ or other superoxide salt) and peroxide ($H_2O_2$ or other peroxides that dissolve in ionic liquids) compounds can diffuse through a concentration gradient and participate in the electrochemical reactions.

The oxygen carrier ion is then transported across the cell through an electrolyte membrane at an intermediate temperature of at or above 100° C. and at or less than 300° C. 306. Using the superoxide, peroxide, and/or nitrite ion as an oxygen carrier ion allows for the transport of the ion to consume less than four electrons. The oxygen carrier ion is rapidly transported at a flux of at least 10 mol $m^{-2}$ $h^{-1}$. The oxygen carrier ion is oxidized at a second electrode (e.g., anode) of the electrochemical cell 308 and an output oxygen gas is discharged 310. In certain embodiments, the pressure of the input gas is greater than the pressure of the output discharged oxygen gas, and in other embodiments, the pressure of the output discharged oxygen gas is greater than the pressure of the input gas. Thus, the described process and system can be used to separate, purify, and/or compress oxygen.

The following examples describe various embodiments of the above-described systems and methods.

EXAMPLES

Energy Consumption

The selected oxygen ion carriers consume less than four electrons to transport an oxygen molecule across the electrolyte membrane. For example, superoxide ions consume one electron and peroxide ions consume two electrons. In contrast, oxygen carriers such as hydroxides and oxides consume four. Thus, the described processes consume half to a quarter of the energy of conventional oxygen separation processes. This is shown below through comparison.

The single electron process enables a higher oxygen flux for a given operating current density, as compared with a multiple electron process. This approach also lowers the specific energy consumption (SEC) of the oxygen separation process. The oxygen flux of a ceramic ion transport membrane is compared with that of a superoxide ion transport membrane in accordance with embodiments described herein. As shown in Table 1 below, the ceramic membrane is operated at a temperature of 1000° C. and the superoxide membrane is operated at a temperature at or below 300° C. The oxygen flux of the ceramic membrane was computed using parameters reported in literature, and the oxygen flux of the superoxide membrane was computed from an operating current density of 100 mA $cm^{-2}$ at an applied potential of 0.5 V. Both membranes were compared at the same specific energy consumption that would be competitive with cryogenic air separation (e.g., in the range of 160-530 kWh $ton^{-1}$ $O_2$).

TABLE 1

| Technology | Feed Pressure (bar) | Equivalent SEC (kWh $ton^{-1}$ $O_2$) | Temperature (° C.) | $O_2$ Flux (mol $m^{-2}$ $h^{-1}$) |
|---|---|---|---|---|
| Ceramic ion transport membrane | 10 | 420 | 1000 | 2 |
| Superoxide membrane | 1 | 420 | ≤300 | 37.3 |

The low SEC (e.g., <1000 kWh $ton^{-1}$ $O_2$) and high $O_2$ flux (e.g., >10 mol $m^{-2}$ $h^{-1}$ at an operating potential of less than 1 V) is enabled by the operation at an intermediate temperature (e.g., equal to or above 100° C. and equal to or less than 300° C.) and the energy efficient ionic oxygen transport membrane.

Ionic Liquids

Ionic liquids are suitable media for stably reducing gaseous oxygen to the superoxide ion. However, not all ionic liquids are stable against an attack of the nucleophilic superoxide ion. The generation of the superoxide ion in ionic liquids containing alicyclic and aliphatic ammonium or pyrrolidinium is reported to render greater stability, but imidazolium based ionic liquids are speculated to be unstable. The stability of ionic liquid systems at temperatures above 100° C. and below 300° C., and their efficacy at generation of the superoxide species, is shown below.

It was demonstrated that the reversible generation and subsequent re-oxidation of the superoxide ion can be performed in ionic liquids at an elevated temperature. This was achieved using a three electrode beaker setup with Pt foil (2 cm² each) working and counter electrodes and an Ag|AgCl reference electrode. The electrolyte was selected from the following: 1-ethyl, 3-methylimidazolium trifluorosulfonylimide [emin][tfsi], trimethylbutylammonium, trifluorosulfonylimide [btma][tfsi], and 1-ethyl, 3-methyulimidazolium trifluoromethanesulfonate [emin][OTf]. The setup was heated to a temperature of 225° C., and nitrogen was bubbled for at least thirty minutes to remove all traces of oxygen.

Figure 4:
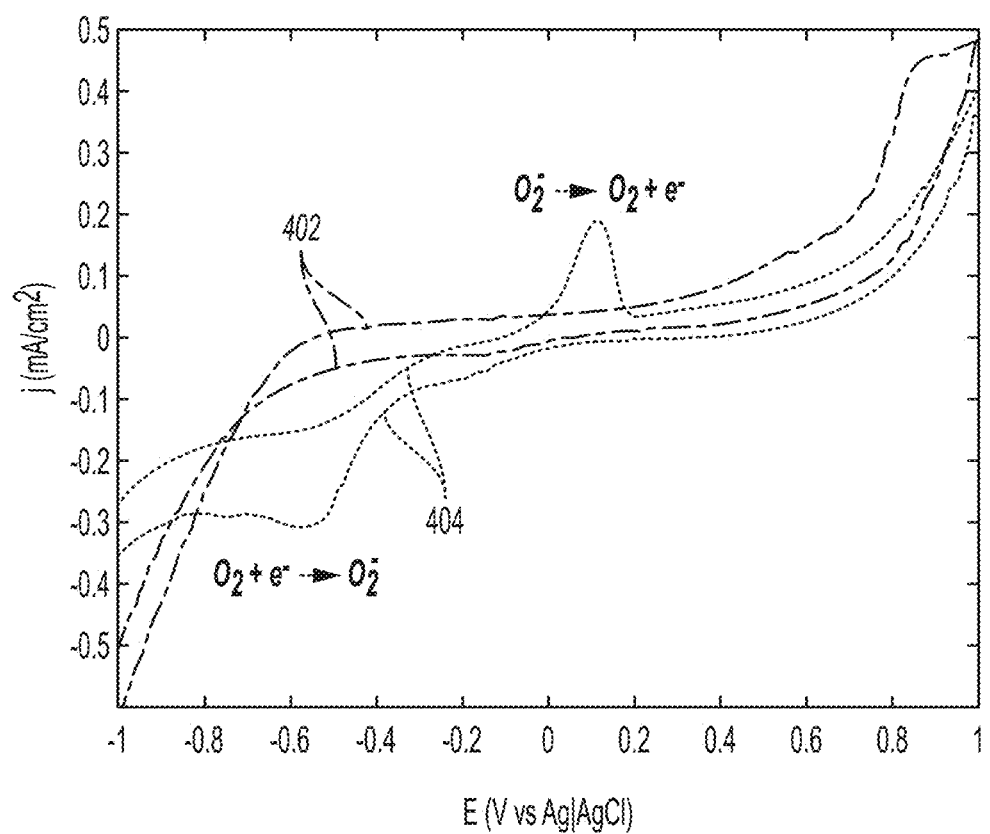
FIG. 4 illustrates cyclic voltammograms for an ionic liquid.

FIG. 4 shows cyclic voltammograms recorded at a scan rate of 5 mV s⁻¹. Curve 402 illustrates the results for the nitrogen saturated [emim][tfsi] electrolyte. Notably, the reduction current density is small due to the absence of oxygen in the N₂-saturated electrolyte. The cell current starts to sharply increase once the applied potential at the working electrode exceeds −0.6 V (vs. the reference electrode) due to the small amount of oxygen present in air reducing to yield the peroxide ion. This reduction has an oxidation peak at a cell potential of approximately 0.8 V, corresponding to the reversible two-electron oxygen transport process mediated by the peroxide ion. Although this process is capable of achieving a higher flux, the peroxide reaction is relatively more energy intensive than the superoxide reduction reaction.

FIG. 4 also shows cyclic voltammograms recorded at a scan rate of 5 mV s⁻¹ for the setup using oxygen saturated electrolyte as curve 404. After completion of the curve 402 voltammogram, oxygen gas was bubbled into the ionic liquid for at least thirty minutes to saturate the electrolyte. A reduction peak at a potential of −0.6 V (vs. the reference electrode) for curve 404 corresponds to the single-electron reduction of dissolved oxygen to yield a superoxide ion. If the potential is scanned to more negative values, the superoxide ion further reduces to the peroxide ion ($O_2^{2-}$). When the scan is reversed, a single oxidation peak occurs at +0.1 V, which corresponds to the generation of oxygen gas through superoxide oxidation. The ratio of the oxidation and reduction peaks is 0.64:1, indicating at least partial reversibility of superoxide generation. The remainder is consumed in the generation of the superoxide ion as indicated by the plateau at −0.2 V.

Figure 5A:
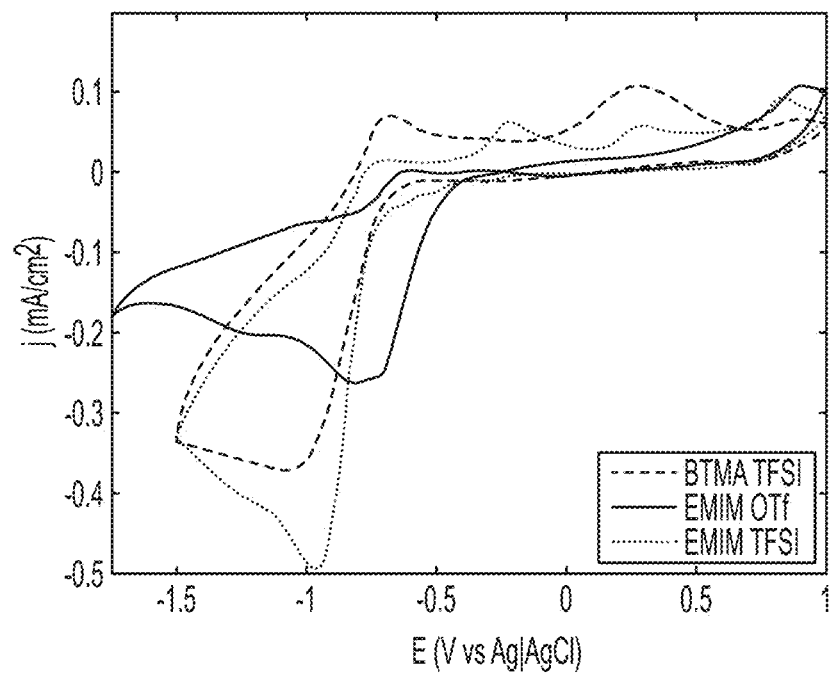
FIG. 5A illustrates cyclic voltammograms for various ionic liquids at 25° C.
Figure 5B:
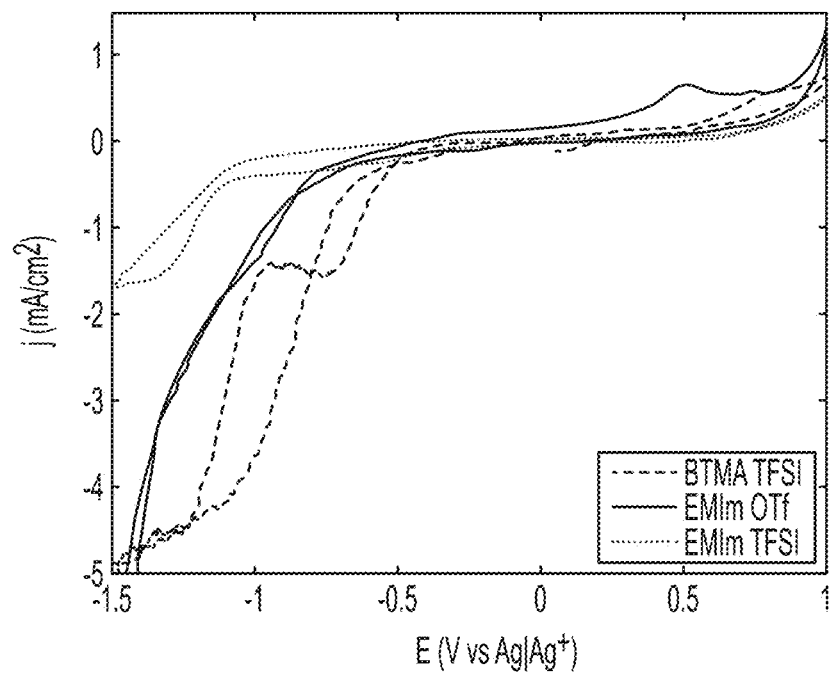
FIG. 5B illustrates cyclic voltammograms for the ionic liquids of FIG. 5A at 220° C.

FIGS. 5A-B illustrate results for the setup described in FIG. 4 using different electrolytes and temperatures. Each of the three electrolytes was saturated with oxygen and the same cyclic voltammograms were recorded for each. FIG. 5A shows the results for the setup performed at 25° C., and FIG. 5B shows the results for the setup performed at 220° C. The superoxide ion is particularly reactive and stabilized by weak Lewis acids such as ionic liquids containing the ammonium, phosphonium, pyrrolidinium, pyridinium, or imidazolium cations. An additional parameter influencing ionic liquid selection is the concentration of cationic species in the ionic liquid. The presence of a high cationic concentration renders the ionic liquid susceptible to nucleophilic attack by the superoxide ion, affecting the long-term stability. For example, the stability of the superoxide ion in dimethyl, 3-propylimidazolium is reportedly low due to nucleophilic attach at the 2-Carbon position. The presence of anionic species affects the hydrophilicity or hydrophilicity of the ionic liquid, and has a marginal impact on superoxide stability. Examples of cations include ionic liquids containing the triflouromethanesulfonate, trifluromethanesulfonylimide and hexafluorophosphate anions. In addition to the properties listed above, ionic liquid carriers may also be determined based on their conductivity, viscosity, oxygen solubility, and/or thermal stability.

The thermal stability of various ionic liquids was determined using mass loss experiments and Fourier-transform infrared (FTIR) spectroscopy. The following eleven ionic liquids were tested for their thermal stability (e.g., use at temperatures at or above 100° C. and at or below 300° C.): 1-ethyl-3-methylimidazolium triflate, 1-hexyl-3-methylimidazolium bis(trifluoromethylsulfonyl)imide, 1-ethyl-3-methylimidazolium dicyanamide, 1-butyl-3-methylimidazolium dicyanamide, 1-ethyl-3-methylimidazolium bis(trifluoromethylsulfonyl)imide, 1-ethyl-3-methylimidazolium hydrogensulfate, 1-butyl-1-methylpyrrolidinium dicyanamide, 1-butyl-1-methylpiperidinium bis(trifluoromethylsulfonyl)imide, 1-butyl-3-methylpiperidinium tetrafluoroborate, 1-butyl-3-methylpiperidinium bis(trifluoromethylsulfonyl)imide, tributylmethylammonium bis(trifluoromethylsulfonyl)imide.

Samples of ten grams of each ionic liquid were dried prior to testing to remove water (three days at 125° C. in N₂). The samples were then heated at 270° C. for twenty-four hours in air. This produced two types of degradation product: 1) volatile (mass loss) and 2) non-volatile (mass neutral or mass increase–formation of oxygen compounds). Mass loss is the difference between dried and final samples and provides the total liquid plus solids (if present) at the end of testing. Multiple samples resulted in solid deposition (i.e., degradation product), but the mass change was not significant such that it was a non-volatile degradation process.

For comparison, the least thermally stable sample was 1-ethyl-3-methylimidazolium dicyanamide. There was a noticeable tendency to change color during the drying process (i.e., heated at 125° C.), and the final sample was entirely a solid. This represented total degradation of the sample. In contrast, the most thermally stable sample was 1-ethyl-3-methylimidazolium triflate. There was no noticeable color change during the drying process, and the final sample was a dark colored liquid with a very small amount of precipitate (e.g., too small to quantify). This sample demonstrated a mass loss of <1%, therefore, it meets the thermal stability requirements for use as an electrolyte at temperatures above 100° C. and below 300° C.

Figure 6:
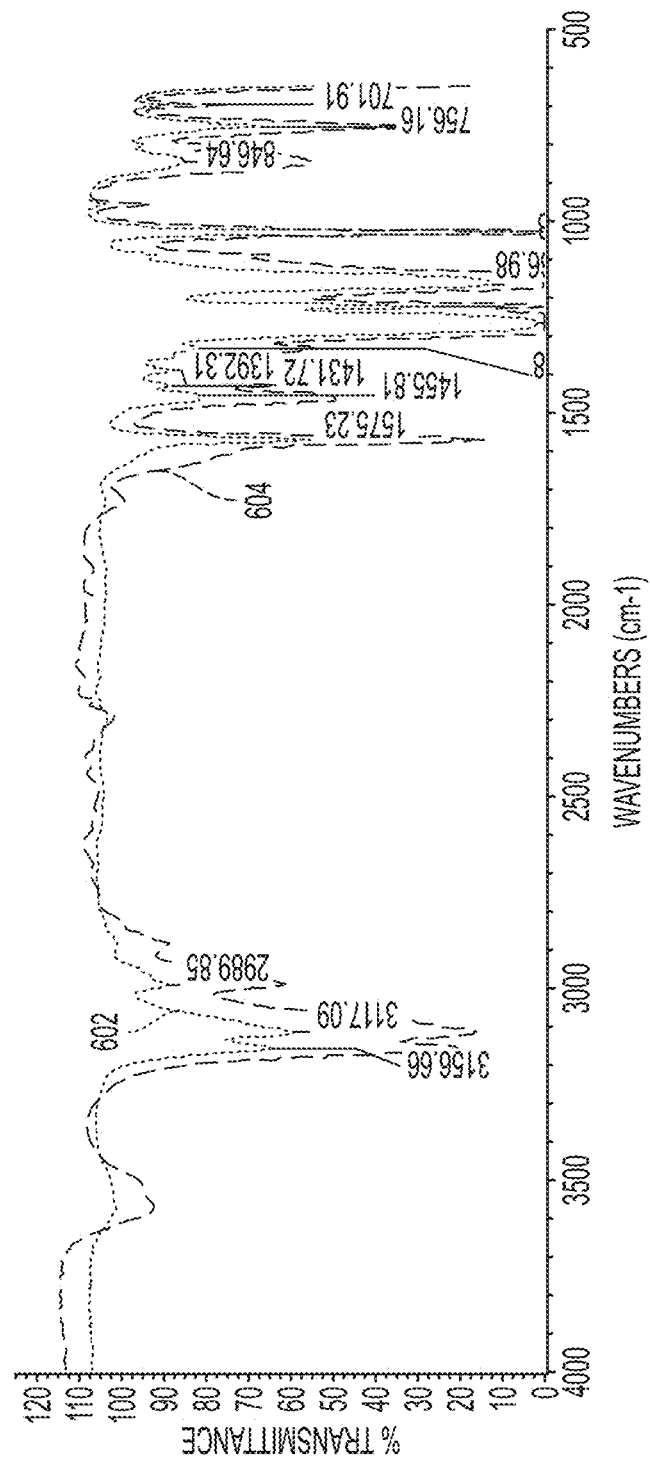
FIG. 6 is a Fourier-transform infrared spectroscopy analysis of an ionic liquid before and after thermal stability testing.

Degradation of the samples was also measured using FTIR spectroscopy. The optical transmittance of the ionic liquids was measured before and after the thermal event (i.e., drying at 270° C. for twenty-four hours) between the wavenumbers of 500 and 4000 cm⁻¹. A significant change in absorption lines would indicate losses of functional groups (i.e., relevant degradation). A general loss of intensity is not necessarily problematic since many impurities in the ionic liquids are known to break down thermally and contribute to loss of intensity without the ionic liquid losing efficacy. FIG. 6 illustrates the spectroscopy results for 1-ethyl, 3-methyulimidazolium trifluoromethanesulfonate [emin] [OTf] (e.g., the ionic liquid of FIG. 4). The minimal change between the peaks prior to the thermal event (curve 602) and after the thermal event (curve 604) indicates excellent thermal stability with minimal, or no, loss of functional groups. Thus, at least certain ionic liquids such as [emin] [OTf] can be used in an electrolyte membrane at temperatures above 100° C. and below 300° C.

Ionic liquids having high solubility for super oxide salts, high stability for electrochemical reactions, and high thermal stability up to 300° C. can be used in an electrolyte membrane. For example, the ionic liquid can comprise ions of at least one of piperidium, phosphonium, pyridinium, pyrrolidinium, and ammonium. More specific examples of ionic liquids include: 1-3-methoxypropyl-1-methylpiperidinium bis(trifluoromethylsulfonyl) imide; 1-(2-methoxyethyl)-1-methylpiperidinium tris-(pentafluoroethyl) trifluorophosphate; trihexyl (tetradecyl)phosphonium tris (pentafluoroethyl) trifluorophosphate; trihexyl (tetradecyl) phosphonium chloride; tris(n-hexyl) tetradecylphosphonium trifluorotris (pentafluoroethyl)phosphate; tris(n-hexyl)tetradecylphosphonium bis (trifluoromethylsulfonyl) imide; trihexyl (tetradecyl)phosphonium dicyanamide; 1-(2-methoxyethyl)-1-methylpyridinium tris (pentafluoroethyl) trifluorophosphate; N-(3-hydroxypropyl)pyridinium bis (trifluoromethylsulfonyl)imide; N-hexylpyridinium bis(trifluoromethylsulfonyl) imide; 1-butyl-1-methylpyrrolidinium trifluoromethanesulfonate; N-butyl-N-methylpyrrolidinium bis (trifluoromethanesulfonyl)imide; 1-hexyl-1-methylpyrrolidinium bis(trifluoromethylsulfonyl) imide; 1-butyl-1-methylpyrrolidinium trifluoroacetate; 1-ethyl-3-methylimidazolium tetracyanoborate; 1-methyl-3-octylimidazolium bis(trifluoromethylsulfonyl)imide; 1,2-dimethyl-3-N-butyl-imidazolium hexafluorophosphate; 1,2-dimethyl-3-propylimidazolium bis(trifluoromethylsulfonyl)imide; 1,3-dimethylimidazolium diphosphate; 1,3-dimethylimidazolium trifluoromethanesulfonate; 1-ethyl-3-methylimidazolium bis(trifluoromethylsulfonyl)imide; 1-ethyl-3-methylimidazolium ethylsulfate; 1-ethyl-3-methylimidazolium tetrafluoroborate; 1-n-propyl-3-methylimidazolium tetrafluoroborate; 1-butyl-3-methulimidazolium tetracyanoborate; 1-butyl-2,3-dimethylimidazolium trifluoromethanesulfonate; 1-butyl-2,3-methylimidazolium bis ((trifluoromethanesulfonyl)imide; 1-butyl-3-methylimidazolium bis (trifluoromethylsulfonyl)imide; 1-butyl-3-methylimidazolium hexafluorophosphate; 1-butyl-3-methylimidazolium tetrafluoroborate; 1-n-butyl-3-methylimidazolium tetrafluoroborate; 1-hexyl-3-methylimidazolium chloride; 1-hexyl-3-methylimidazolium trifluorotris (pentafluoroethyl)phosphate; 1-hexyl-3-methylimidazolium bis (trifluoromethylsulfonyl)imide; 1-hexyl-3-methylimidazolium tetracyanoborate; 1-octyl-3-methylimidazolium chloride; trimethylbutylammonium bis (trifluoromethylsulfonyl)imide; N-ethyl-N,N-dimethyl-2-methoxyethylammonium bis(trifluoromethylsulfonyl)imide; n-hexyltriethylammonium bis(trifluoromethylsulfonyl) imide; trimethyl-n-hexylammonium bis (trifluoromethylsulfonyl)imide; triethylbutylammonium bis (trifluoromethylsulfonyl)imide; and tetrabutylammonium hexafluorophosphate.

Example Embodiments

An example system was demonstrated in a Swagelok cell having an active area of about 1.27 cm². A Nafion 212 membrane (50 μm thick) was saturated with [emim][OTf] under vacuum at 125° C. for at least twenty-four hours to achieve superoxide conductivity. The membrane was coupled with twin Pt catalyst-coated gas diffusion electrodes (4 $mg_{Pt}$ cm$^{-2}$) and PTFE sealing gaskets to form a membrane-electrode assembly within the Swagelok cell.

Figure 7:
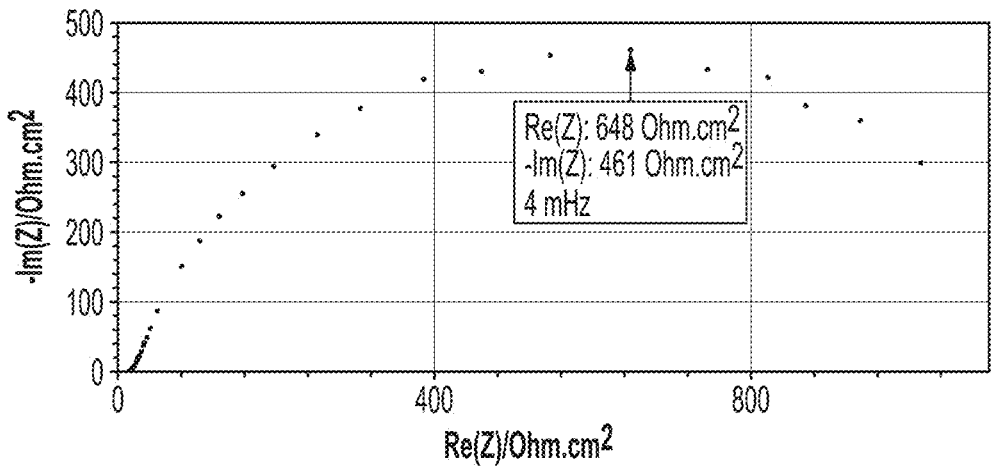
FIG. 7 is a Nyquist plot of electrochemical impedance of an electrochemical cell in accordance with certain embodiments.

Using electrochemical impedance spectroscopy, the timescales and magnitude of the system impedance was determined at an operating temperature of 107° C. to identify the rate-controlling processes. The results are shown in the Nyquist plot of FIG. 7. An oscillating potential of 10 mV about the open circuit potential was applied, and the oscillation frequency was progressively reduced from 2 MHz to 0.5 mHz. The system has a high frequency impedance of 14 Ωcm², corresponding to ionic migration within the membrane. The charge-transfer impedance is virtually indistinguishable, although a capacitive loop is observed, which corresponds to a finite Warburg impedance for the diffusive transport of superoxide species within the membrane. The characteristic frequency of the diffusive process is determined from resonant frequency corresponding to the apex of the capacitive loop (4 mHz), which corresponds to an estimated diffusion coefficient of $1 \times 10^{-1}$ cm$^{-2}$ s$^{-1}$ for the superoxide ion. The equilibrium concentration of the superoxide ion within the membrane is estimated from the Warburg coefficient (a), using equation 1.

$$\sigma = \frac{RT}{n^2 F^2 C_{O_2}} \sqrt{\frac{2}{D_{O_2}}} \quad \text{Equation 1}$$

This corresponds to an equilibrium concentration of 1.5 mM for the superoxide ion within the membrane.

Cell Performance

Figure 8A:
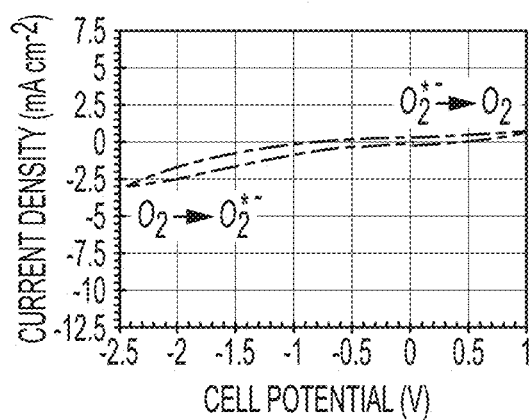
FIG. 8A is a cyclic voltammogram of an electrochemical cell in accordance with certain embodiments at a temperature of 25° C.
Figure 8B:
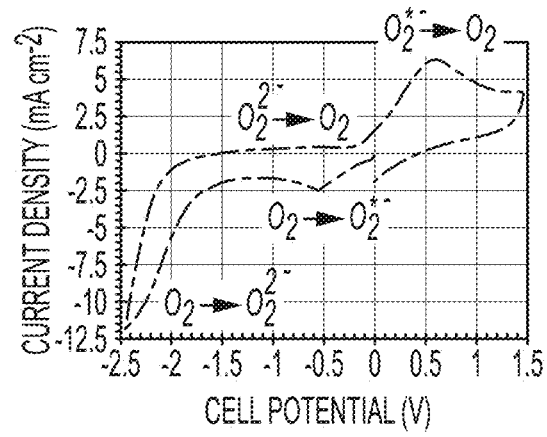
FIG. 8B is a cyclic voltammogram of the electrochemical cell of FIG. 8A in accordance with certain embodiments at a temperature of 107° C.

Cyclic voltammograms were recorded for the above-described cell in a two-electrode setup. FIG. 8A shows the voltammograms recorded at an operating temperature of 25° C., and FIG. 8B shows the voltammograms recorded at an operating temperature of 107° C. The oxygen reduction reaction occurred at the cathode (working electrode) and the counter and reference electrode wires were connected to the anode. The cell potential was swept within the range −2.45 V to 1.5 V at a scan rate of 10 mV s$^{-1}$. The curve of FIG. 8A indicates sluggish reaction kinetics for a system operating at a low temperature. As discussed above, this is expected for systems involving the dissolution of a superoxide salt in an aprotic solvent. The superoxide reaction kinetics are considerably faster at 107° C. in FIG. 8B, achieving an oxygen flux using the superoxide carrier with an applied overpotential of only 0.5 V. FIG. 8B shows that the magnitudes of the oxidation and reduction peaks are nearly equal, which is indicative of reversible reaction kinetics. The limiting current density in FIG. 8B for the superoxide reduction (−0.6 V) is substantially higher than the value in FIG. 8A, and indicates performance gains available through operation at an elevated temperature.

Reversible Operation

Figure 9A:
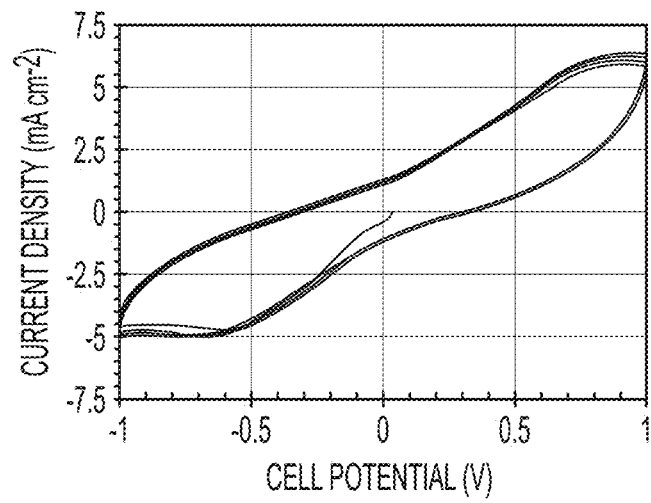
FIG. 9A is a cyclic voltammogram of an electrochemical cell in accordance with certain embodiments.
Figure 9B:
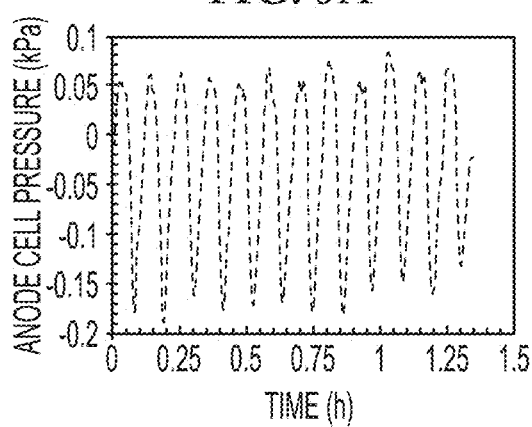
FIG. 9B is graph of the anode cell pressure of the electrochemical cell of FIG. 9A as a function of time.
Figure 9C:
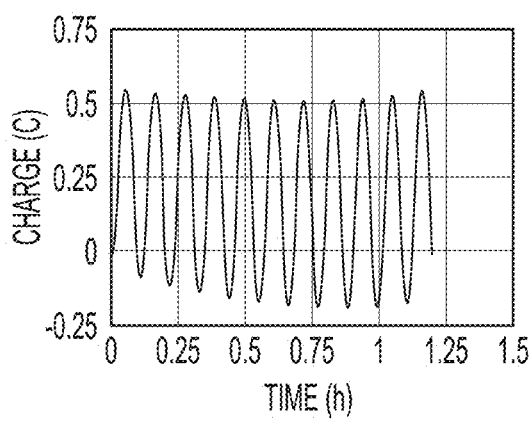
FIG. 9C is a graph of the charge passed by the electrochemical cell of FIG. 9A as a function of time.
Figure 10:
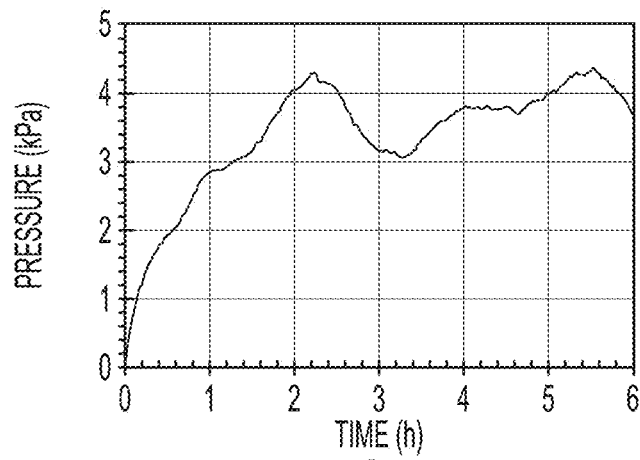
FIG. 10 is a graph of anode cell pressure as a function of time for an electrochemical cell in accordance with certain embodiments.

The reversible operation of the above-described cell was demonstrated by repeatedly scanning the potential within the range −1 to +1 V for ten cycles. The anode chamber was sealed, and a pressure transducer was used to record the pressure within the anode chamber. The pressure in the anode chamber varies based on oxygen buildup or removal. The results of a repeated scan are shown in FIGS. 9A-C. FIG. 9A shows the voltammogram recorded in air for the ten cycles. FIG. 9B shows the change in anode cell pressure as a function of time during the scan, and FIG. 9C shows the charge variance as a function of time during the scan. FIG. 9B indicates that the pressure changed due to oxygen generation, and FIG. 9C indicates a stable system where the magnitude of the redox current remained stable over at least the ten cycles. Also, the pressure transient of FIG. 9B correlates with the net charge passed of FIG. 9C, which indicates the absence of secondary products.

Oxygen Compression

The above-described cell was operated at 107° C., and a cell potential of −500 mV was applied at the cathode. The pressure in the anode chamber was allowed to build up as a result of oxygen generation and was recorded with a pressure transducer. The results are shown in the graph of FIG.

10. A maximum pressure differential of 4.5 kPa was created, and sustained, over the duration of the oxygen compression experiment.

Oxygen Removal

Figure 11:
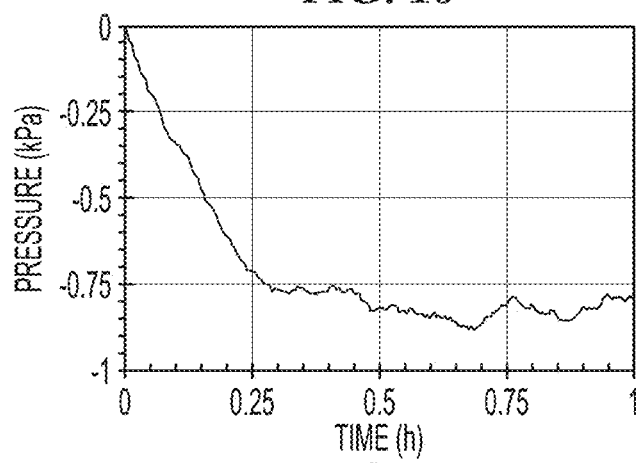
FIG. 11 is a graph of anode cell pressure as a function of time for an electrochemical cell in accordance with certain embodiments.

The above-described cell was operated at 107° C., and a cell potential of +500 mV was applied at the cathode. The pressure in the anode chamber depleted due to oxygen removal and subsequent discharge into ambient air and was recorded with a pressure transducer. The results are shown in the graph of FIG. 11. A maximum pressure differential of −0.85 kPa was created, and sustained, over the duration of the oxygen removal experiment.

Oxygen Purification

Figure 12:
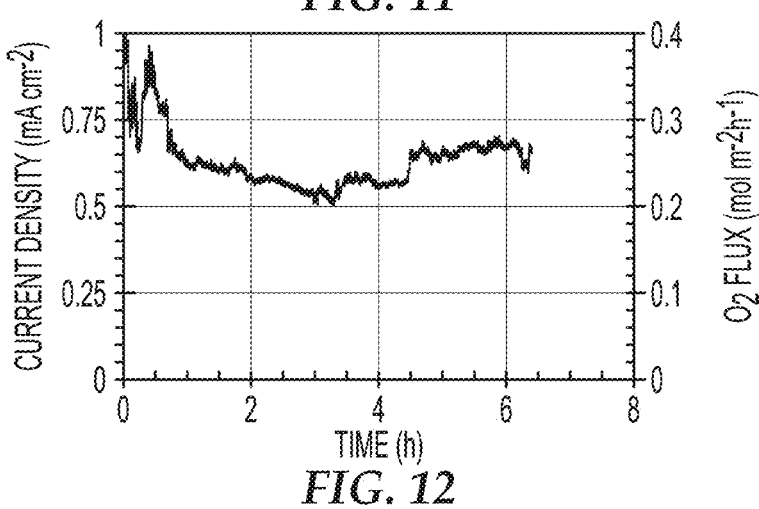
FIG. 12 is a graph of current density and equivalent oxygen flux as a function of time for an electrochemical cell in accordance with certain embodiments.

The above-described cell was operated at 107° C. in air, and a cell potential of −500 mV was applied at the cathode. The anode was uncapped, and continuous, stable $O_2$ flux was demonstrated for at least six hours. The results are shown in the graph of FIG. 12. There was no hydrostatic pressure difference across the membrane, and the partial pressure of oxygen was higher in the anode compartment even though the total pressure remained the same. Thus, the electrochemical cell can be used to concentrate/purify an oxygen stream.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A system, comprising:
   a first electrode configured to reduce oxygen in a gas to an oxygen carrier ion at an intermediate temperature equal to or above 100° C. and equal to or less than 300° C.;
   an electrolyte membrane configured to transport the oxygen carrier ion; and
   a second electrode configured to receive the oxygen carrier ion and oxidize the oxygen carrier ion to an oxygen molecule, wherein oxidation of the oxygen molecule consumes less than four electrons.

2. The system of claim 1, wherein the electrolyte membrane comprises a nanoporous support and at least one of a poly(electrolyte) and an ionic liquid.

3. The system of claim 2, wherein the nanoporous support comprises at least one of polyimide, polycarbonate, polytetrafluoroethylene, perflouroelastomer, alumina, zirconia, and silica.

4. The system of claim 2, wherein the ionic liquid comprises cations of at least one of piperidium, phosphonium, pyridinium, pyrrolidinium, and ammonium.

5. The system of claim 2, wherein the ionic liquid comprises anions of at least one of trifluoromethanesulfonate, hexafluorophosphate, trifluoromethanesulfonylimide, superoxide, and peroxide.

6. The system of claim 1, wherein the electrolyte membrane is configured to transport the oxygen carrier ion at a flux of at least 10 mol $m^{-2}$ $h^{-1}$.

7. The system of claim 1, wherein the oxygen carrier ion is at least one of a superoxide, peroxide, and a nitrate ion.

8. The system of claim 1, wherein the electrolyte membrane comprises a polymer membrane configured to transport a superoxide ion.

9. The system of claim 1, wherein at least one of the first and second electrodes comprises a catalyst.

10. The system of claim 1, wherein the electrolyte membrane has a thickness of less than about 250 µm.

11. The system of claim 1, further comprising an output oxygen stream coupled to the second electrode, wherein a ratio of partial pressure of oxygen in the output stream to partial pressure of oxygen in the gas is greater than 1.

12. The system of claim 1, further comprising an output oxygen stream coupled to the second electrode, wherein the output oxygen stream has a higher pressure than the gas.

13. The system of claim 1, further comprising an output oxygen stream coupled to the second electrode, wherein the output oxygen stream has a partial pressure lower than about 0.05 bar.

14. An apparatus comprising:
   a first system according to claim 1; and
   a second system according to claim 1.

15. The apparatus of claim 14, wherein the first and second systems are connected in parallel.

16. The apparatus of claim 14, wherein the first and second systems are connected in series.

17. A method comprising:
   receiving an input gas comprising oxygen;
   contacting the gas with a first electrode of an electrochemical cell to reduce the oxygen to an oxygen carrier ion;
   transporting the oxygen carrier ion across the cell through an electrolyte membrane;
   oxidizing the oxygen carrier ion to form an oxygen molecule at a second electrode of the electrochemical cell; and
   discharging an output oxygen gas,
   wherein the method is performed at an intermediate temperature, equal to or above 100° C. and equal to or less than 300° C., and consumes less than four electrons per oxygen molecule.

18. The method of claim 17, wherein the pressure of the input gas is greater than the pressure of the output oxygen gas.

19. The method of claim 17, wherein the pressure of the output oxygen gas is greater than the pressure of the input gas.

* * * * *